US011323911B2

(12) United States Patent
Dai et al.

(10) Patent No.: US 11,323,911 B2
(45) Date of Patent: May 3, 2022

(54) RADIO BEARER CONFIGURATION METHOD AND APPARATUS FOR CONFIGURING A DUAL CONNECTIVITY TERMINAL

(71) Applicant: ZTE Corporation, Guangdong (CN)

(72) Inventors: Qian Dai, Guangdong (CN); He Huang, Guangdong (CN); Zijiang Ma, Guangdong (CN); Xin Wang, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/716,354

(22) Filed: Dec. 16, 2019

(65) Prior Publication Data

US 2020/0120535 A1 Apr. 16, 2020

Related U.S. Application Data

(63) Continuation of application No. PCT/CN2018/088448, filed on May 25, 2018.

(30) Foreign Application Priority Data

Jun. 16, 2017 (CN) .......................... 201710459099.5

(51) Int. Cl.
*H04W 28/02* (2009.01)
*H04W 76/27* (2018.01)
(Continued)

(52) U.S. Cl.
CPC ... *H04W 28/0263* (2013.01); *H04W 28/0268* (2013.01); *H04W 76/11* (2018.02);
(Continued)

(58) Field of Classification Search
CPC ......... H04W 28/0263; H04W 28/0268; H04W 28/24; H04W 72/0426; H04W 76/00;
(Continued)

(56) References Cited

U.S. PATENT DOCUMENTS 10,362,615 B2  7/2019  Hong et al.
10,511,981 B2  12/2019  Lee et al.
(Continued)

FOREIGN PATENT DOCUMENTS

CN   104349389 A    2/2015
CN   104349500 A    2/2015
(Continued)

OTHER PUBLICATIONS

International Search Report and Written Opinion dated Aug. 3, 2018 for International Application No. PCT/CN2018/088448, filed on May 25, 2018 (12 pages).

(Continued)

*Primary Examiner* — Mewale A Ambaye
(74) *Attorney, Agent, or Firm* — Perkins Coie LLP

(57) ABSTRACT

Provided are a radio bearer configuration method and apparatus. The method includes: determining, by a first node, configuration information for a terminal in case that the first node determines a second node to be connected to the terminal, where the terminal is connected to the first node and the configuration information is configured by the first node and/or the second node; and sending the configuration information to the terminal, where the configuration information is configured for instructing the terminal to be connected to the first node and the second node according to the configuration information, and the terminal establishes multiple connections.

16 Claims, 6 Drawing Sheets

(51) Int. Cl.
  *H04W 80/08* (2009.01)
  *H04W 76/11* (2018.01)
  *H04W 84/20* (2009.01)
(52) U.S. Cl.
  CPC ........... *H04W 76/27* (2018.02); *H04W 80/08* (2013.01); *H04W 84/20* (2013.01)
(58) Field of Classification Search
  CPC ..... H04W 76/11; H04W 76/12; H04W 76/15; H04W 76/18; H04W 76/27; H04W 80/08; H04W 84/20; H04W 28/0252; H04W 8/26; H04W 76/10
  See application file for complete search history.

(56) References Cited

U.S. PATENT DOCUMENTS

| | | | |
|---|---|---|---|
| 10,728,876 | B2 | 7/2020 | Lin et al. |
| 2016/0174281 | A1* | 6/2016 | Wen ................... H04W 72/042 370/329 |
| 2016/0316508 | A1 | 10/2016 | Hong et al. |
| 2017/0055313 | A1* | 2/2017 | Sharma ............. H04W 36/0066 |
| 2017/0086254 | A1 | 3/2017 | Lee et al. |
| 2019/0215717 | A1* | 7/2019 | Lee ....................... H04W 24/10 |
| 2019/0320476 | A1* | 10/2019 | Wang ................ H04W 28/0268 |
| 2019/0342932 | A1* | 11/2019 | Futaki ................... H04W 76/15 |
| 2020/0008118 | A1* | 1/2020 | Han ..................... H04W 68/005 |
| 2020/0260524 | A1* | 8/2020 | Kim ...................... H04W 80/08 |
| 2020/0267761 | A1* | 8/2020 | Lee ....................... H04W 76/19 |
| 2020/0389809 | A1* | 12/2020 | Jiang .................... H04W 28/24 |

FOREIGN PATENT DOCUMENTS

| | | |
|---|---|---|
| CN | 104796948 A | 7/2015 |
| CN | 105684491 A | 6/2016 |
| CN | 105766052 A | 7/2016 |
| CN | 105917727 A | 8/2016 |
| CN | 106538034 A | 3/2017 |
| CN | 106686751 A | 5/2017 |
| KR | 10-2014-0133463 A | 11/2014 |
| KR | 10-2016-0136398 A | 11/2016 |
| WO | 2015108389 A1 | 7/2015 |
| WO | 2015/115034 A1 | 8/2015 |

OTHER PUBLICATIONS

3GPP, "3rd Generation Partnership Project; Technical Specification Group Radio Access Network; Study on New Radio Access Technology (Release 14)," 3GPP TR 38.912 V0.0.2, 26 pages, Sep. 2016.

Extended Search Report dated May 26, 2020 for European Application No. 18817849.5, filed on May 25, 2018 (7 pages).
Qualcomm Incorporated, R2-1702940, QoS for option 3/3a/3x, 3GPP TSG RAN WG2 #97bis, 3GPP Server Publication Date (Mar. 25, 2017), 3 pages.
LG Electronics Inc., R3-170955, Issues on QoS in NG-RAN, 3GPP TSG RAN WG3 #95bis, 3GPP Server Publication Date (Mar. 25, 2017), 5 pages.
Ericsson, R2-1706635, Addition, modification, and release of DRBs in EN-DC, 3GPP TSG RAN WG2 #AHS, 3GPP Server Publication Date (Jun. 16, 2017), 4 pages.
Samsung, NR + NR DC: QOS decision responsibilities[online], 3GPP TSG RAN WG2 #98 R2-1705348, URL:http://www.3gpp.org/ftp/tsg_ran/WG2_RL2/TSGR2_98/Docs/R2-1705348.zip, May 6, 2017, 6 pages.
CATT, Stage 2 TP for bearer type change between SCG and SCG split bearer[online], 3GPP TSG RAN WG3 #96 R3-171589, URL:http://www.3gpp.org/ftp/tsg_ran/WG3_lu/TSGR3_96/Docs/R3-171589.zip, May 6, 2017, 5 pages.
Catt, "QoS for eLTE and NR interworking," 3GPP TSG-RAN WG3 #95bis, Spokane, Washington, USA, Apr. 3-7, 2017, R3-171011, 3 pages.
ZTE Corporation, "Discussion on Section 10 for TS 37.340," 3GPP TSG-RAN WG3 Meeting #96, Hangzhou, China, May 15-19, 2017, R3-171512, 5 pages.
Korean Notice of Allowance dated Oct. 22, 2021 for Korean Patent Application No. 10-2020-7001403, filed May 25, 2018 (7 pages).
European Office Action dated Dec. 8, 2021 for European Patent Application No. 18817849.5, filed May 25, 2018 (4 pages).
Japanese Office Action dated Feb. 16, 2021 for Japanese Patent Application No. 2019-569485 filed on May 25, 2018 (7 pages).
Japanese Office Action dated Nov. 30, 2021 for Japanese Patent Application No. 2019-569485 filed on May 25, 2018 (7 pages).
Korean Office Action dated Jan. 29, 2021 for Korean patent Application No. 10-2020-7001403, filed on May 25, 2018 (10 pages).
Chinese Office Action dated Jun. 24, 2021 for Chinese Patent Application No. 201710459099.5, filed on Jun. 16, 2017 (13 pages).
Chinese Office Action dated Jan. 4, 2022 for Chinese Patent Application No. 201710459099.5, filed on Jun. 16, 2017 (11 pages).
ZTE Corporation, "Consideration on the LTE/NR tight interworking with NG-C,"3GPP TSG-RAN WG2 Meeting #98, Hangzhou, China, R2-1704656, 3 pages, May 15-19, 2017.
Catt, "Stage 3 TP for bearer type change between SCG and SCG split bearer," 3GPP TSG-RAN WG3, #96, Hangzhou, PR China, R3-171591, 5 pages, May 15-19, 2017.
ZTE Corporation, "Further Consideration on QOS Flow and DRB Mapping Management," 3GPP TSG-RAN WG3 Meeting #96, Hangzhou, China, R3-171659, 3 pages, May 15-19, 2017.

* cited by examiner

RADIO BEARER CONFIGURATION METHOD AND APPARATUS FOR CONFIGURING A DUAL CONNECTIVITY TERMINAL

CROSS-REFERENCES TO RELATED APPLICATIONS

This patent document is a continuation of and claims the benefit of priority to International Patent Application No. PCT/CN2018/088448, filed on May 25, 2018, which claims the benefit of priority of Chinese Patent Application No. 201710459099.5, filed on Jun. 16, 2017. The entire contents of the before-mentioned patent applications are incorporated by reference as part of the disclosure of this application.

TECHNICAL FIELD

The present application relates to, but is not limited to, the field of communications and, in particular, relates to a radio bearer configuration method and apparatus.

BACKGROUND

In the related art, FIG. 1 is a schematic diagram illustrating system architecture of a dual connectivity (DC) system in the related art.

In the DC system, for a user equipment (UE) with multiple receivers and transmitters (Rx/Tx), the current serving base station (referred to as a first network element) of the UE in the new generation radio access network (NG-RAN) may select an appropriate base station (for example, a quality of a radio channel satisfies a certain threshold) for the UE and add it to the UE (the base station to be added is referred to as a second network element), so that the two base stations are capable of jointly providing radio resources for the UE for user plane data transmissions. In terms of a wired interface, an NG control plane (NG-C) interface is established for the UE between the first network element and the new generation core network (NG-CN), an NG user plane (NG-U) interface is at most established for the UE between the second network element and the NG-CN, and the first network element and the second network element are connected through an ideal or non-ideal interface (referred to as an Xn interface). In terms of a wireless interface, the first network element and the second network element may provide the same radio access technology (RAT) or different RATs and independently perform scheduling for the UE.

A terminal needs to establish connections with multiple network elements to form the DC or multi-connectivity (MC). In a specific implementation, the DC or the MC provides a non-ideal connection effect.

No efficient solution has been provided to solve the problem in the related art of how to configure a dual connectivity or multi-connectivity terminal.

SUMMARY

The present application provides a radio bearer configuration method and apparatus, to solve at least the problem in the related art of how to configure a dual connectivity or multi-connectivity terminal.

An embodiment of the present application provides a radio bearer configuration method. The method includes steps described below. A first node obtains configuration information for a terminal in case that the first node determines a second node to be connected to the terminal, where the terminal is connected to the first node and the configuration information is configured by the first node and/or the second node. The first node sends the configuration information to the terminal, where the configuration information is configured for instructing the terminal to be connected to the first node and the second node according to the configuration information, and the terminal establishes multiple connections.

Another embodiment of the present disclosure provides a radio bearer configuration method. The method includes: receiving configuration information sent by a first node, where the configuration information carries a configuration of the terminal made by the first node and/or a second node; and being connected to the first node and the second node according to the configuration information.

Another embodiment of the present application provides a radio bearer configuration apparatus. The apparatus is applied to a first node and includes a determining module and a first sending module. The determining module is configured to obtain configuration information for a terminal in case that the first node determines a second node to be connected to the terminal, where the terminal is connected to the first node and the configuration information is configured by the first node and/or the second node. The first sending module is configured to send the configuration information to the terminal, where the configuration information is configured for instructing the terminal to be connected to the first node and the second node according to the configuration information.

Another embodiment of the present application provides a radio bearer configuration apparatus. The apparatus is applied to a second node and includes a first receiving module and a second sending module. The first receiving module is configured to receive a request message sent by a first node connected to a terminal. The second sending module is configured to send configuration information for the terminal configured by the second node to the first node according to the request message, where the second node is connected to the terminal according to the configuration information.

Another embodiment of the present application provides a radio bearer configuration apparatus. The apparatus is applied to a terminal and includes a second receiving module and a connection module. The second receiving module is configured to receive configuration information sent by a first node, where the configuration information carries a configuration of the terminal made by the first node and/or a second node. The connection module is configured to connect the terminal to the first node and the second node according to the configuration information.

Another embodiment of the present application provides a storage medium. The storage medium includes stored programs which, when executed, perform the method according to any one of the optional embodiments described above.

Another embodiment of the present application provides an electronic device. The electronic device includes a memory and a processor, where the processor is connected to the memory and is configured to execute programs stored on the memory, where the programs, when executed, perform the method according to any one of the optional embodiments described above.

In the present application, the first node obtains the configuration information for the terminal in case that the first node determines the second node to be connected to the terminal, where the terminal is connected to the first node and the configuration information is configured by the first node and/or the second node, and the first node sends the configuration information to the terminal, where the configuration information is configured for instructing the terminal to be connected to the first node and the second node according to the configuration information. The first node or the terminal may establish connections between the terminal and multiple nodes according to the configuration information, so as to form dual connectivity or multi-connectivity of the terminal. The configuration information is sent to the terminal, so that the terminal may select an appropriate second node and be connected to the second node, avoiding being connected to a second node with a poor effect, improving a connection effect of dual connections or multiple connections, and improving a communication quality in a dual connectivity or multi-connectivity communication scenario.

BRIEF DESCRIPTION OF DRAWINGS

The drawings described herein are used to provide a further understanding of the present application and form a part of the present application. The exemplary embodiments and descriptions thereof in the present application are used to explain the present application and not to limit the present application in any improper way. In the drawings.

DETAILED DESCRIPTION

Figure 1:
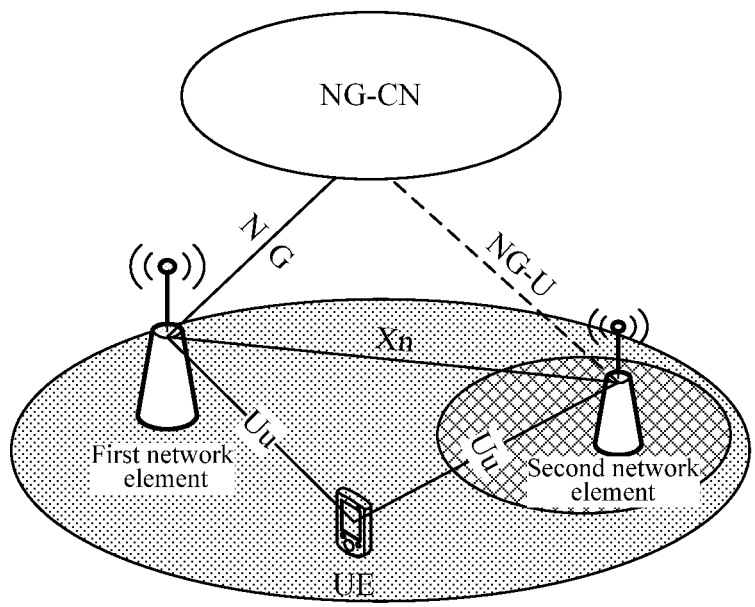
FIG. 1 is a schematic diagram illustrating system architecture of a dual connectivity system in an embodiment of the present application.
Figure 2:
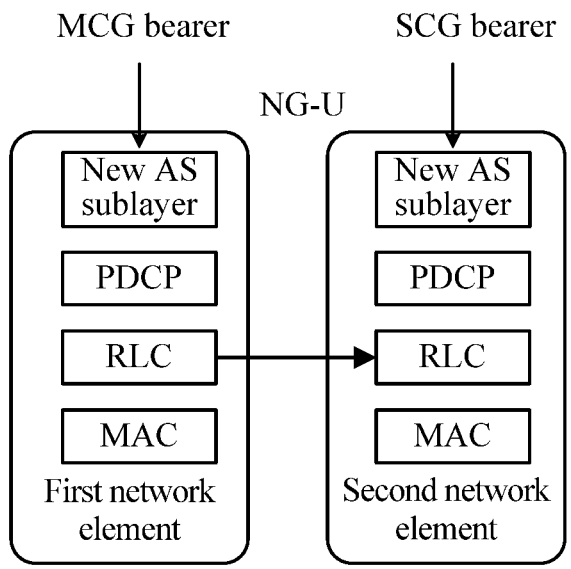
FIG. 2 is a schematic diagram illustrating two types of bearer when a layer 2 (L2) protocol stack is located in a same base station in an embodiment of the present application.

Four types of user plane bearer may be configured in a DC system. For a certain bearer, FIG. 2 is a schematic diagram of two types of bearer when an L2 protocol stack is located in a same base station in the related art. FIG. 2 illustrates the two types of bearer when the whole L2 protocol stack is located in the same base station.

In such a user plane mode, a first network element and a second network element separately establish an NG-U interface with an NG-CN. When the whole L2 protocol stack is located in the first network element, a bearer is referred to as a master cell group (MCG) bearer. When the whole L2 protocol stack is located in the second network element, the bearer is referred to as a secondary cell group (SCG) bearer.

Figure 3:
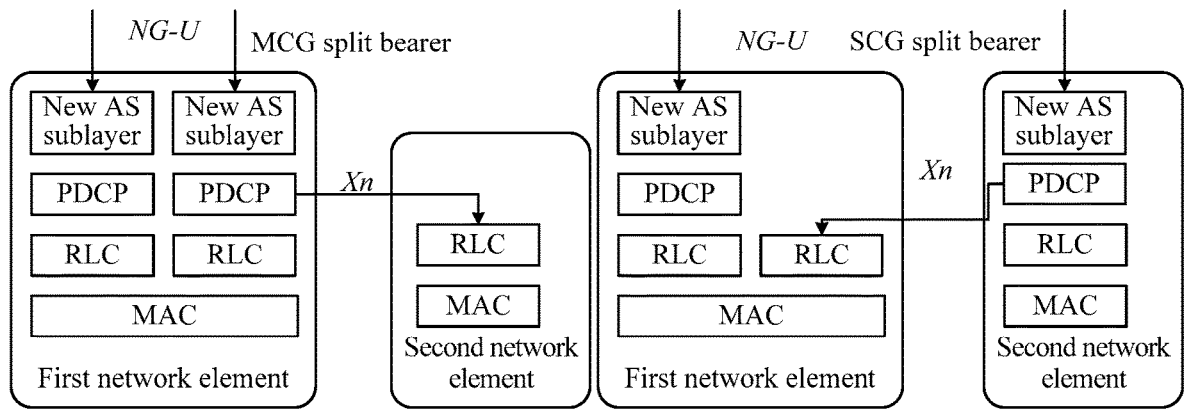
FIG. 3 is a schematic diagram illustrating two types of bearers when an L2 protocol stack is located in two base stations in an embodiment of the present application.

FIG. 3 is a schematic diagram of two types of bearer when an L2 protocol stack is located in two base stations in the related art. As shown in FIG. 3, a left part of FIG. 3 is a schematic diagram of an MCG split bearer, and a right par of FIG. 3 is a schematic diagram of an SCG split bearer. In such a user plane mode, merely the first network element establishes the NG-U interface with the NG-CN, and the second network element merely performs transmissions of a data packet with the first network element through an Xn interface user plane (Xn-U) of an Xn interface. The L2 protocol stack includes a new access stratum (AS) sublayer for mapping QoS flows (QF) to data radio bearers (DRBs), a packet data convergence protocol (PDCP) sublayer, a radio link control (RLC) sublayer and a medium access control (MAC) sublayer. The bearer is configured with two RLC sublayers and two MAC sublayers, and the two RLC sublayers are separately independently located in two base stations and the two MAC sublayers are separately independently located in the two base stations. When the second network element is merely provided with the RLC sublayer and the MAC sublayer, the bearer is referred to as an MCG split bearer. When the first network element is merely provided with the RLC sublayer and the MAC sublayer, the bearer is referred to as an SCG split bearer.

Embodiments of the present application provide a mobile communication network (which includes, but is not limited to, a 5G mobile communication network). Network architecture of the network may include a network side device (such as a base station) and a terminal. The terminal in this embodiment may establish two connections or multiple connections, that is, the network includes the terminal, a master node and one or more secondary nodes. This embodiment provides an information transmission method executable on the preceding network architecture. It is to be noted that an execution environment of a radio bearer configuration method according to the embodiments of the present application is not limited to the preceding network architecture.

It is to be added that a first node in the embodiments of the present application may be the master node (MN) and a second node may be the secondary node (SN). Multiple second nodes may exist, and the terminal establishes the multiple connections. When the first node is the MN, a first node cell group may be an MCG; when the second node is the SN, a second node cell group may be an SCG.

Figure 4:
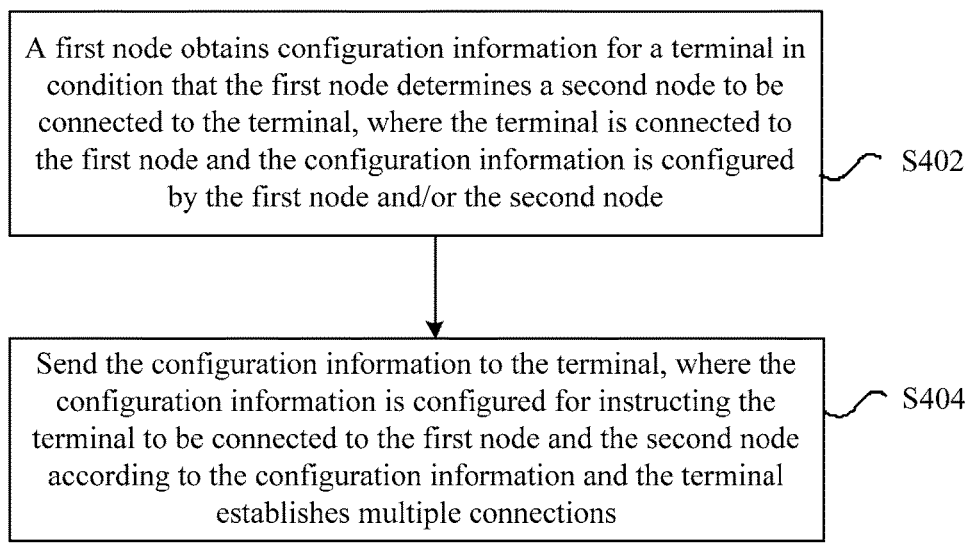
FIG. 4 is a flowchart of a radio bearer configuration method according to an embodiment of the present application.

This embodiment provides a radio bearer configuration method executed on the network architecture described above. FIG. 4 is a flowchart of a radio bearer configuration method according to an embodiment of the present disclosure. As shown in FIG. 4, the method includes steps described below.

In step S402, a first node obtains configuration information for a terminal in case that the first node determines a second node to be connected to the terminal, where the terminal is connected to the first node and the configuration information is configured by the first node and/or the second node.

In step S404, the first node sends the configuration information to the terminal, where the configuration information is configured for instructing the terminal to be connected to the first node and the second node according to the configuration information to establish dual connections or multiple connections. The configuration information may include information such as a node identity (ID) of the second node with which the terminal may establish the dual connections or the multiple connections, so that the first node or the like uniformly controls the dual connections or the multiple connections of the terminal, avoiding the problems of a poor connection quality of the dual connections or the multiple connections due to a large load of a same node connected to a large number of terminals within a period of time, and a ping-pong handover effect due to the poor connection quality, and improving a connection quality of the dual connections or the multiple connections. Of course, the above is merely an example of the configuration information and in a specific implementation, the configuration information is not limited to the preceding example.

In the preceding steps, the first node obtains the configuration information for the terminal in case that the first node determines the second node to be connected to the terminal, where the terminal is connected to the first node and the configuration information is configured by the first node and/or the second node, and the first node sends the configuration information to the terminal, where the configuration information is configured for instructing the terminal to be connected to the first node and the second node according to the configuration information, and the terminal establishes the multiple connections. The preceding technical solution solves the problem in the related art of how to configure a dual connectivity or multi-connectivity terminal and enables the terminal to establish the multiple connections according to the configuration information configured by the first node or the second node.

In some embodiments, the preceding steps may, but may not necessarily, be executed by a base station or the like.

In some embodiments, before the first node obtains the configuration information for the terminal, the method further includes: determining, according to a first preset manner, a mapping relationship between QoS flows and data radio bearers (DRBs) and/or a mapping relationship between the QoS flows and logical channels (LCHs).

In some embodiments, the method further includes a step described below.

The configuration information is formed according to the mapping relationship between QoS flows and DRBs and/or the mapping relationship between the QoS flows and LCHs. For example, the configuration information carries any one of the mapping relationships. In this way, after receiving the configuration information, the terminal may know the mapping relationship between QoS flows and DRBs and/or the mapping relationship between the QoS flows and LCHs. When the terminal performs communications by using the dual connections and the multiple connections, the DRBs or the LCHs of a bearer may be determined according to the QoS flows of current data to be transmitted, and thus one of the dual connections or the multiple connections may be selected to transmit the data, thereby ensuring a communication quality of the communications with the dual connections and the multiple connections, and reducing the problem of a poor communication quality when high-QoS flows are transmitted on an inappropriate DRB or LCH.

In some embodiment, the step of determining, in the first preset manner, the mapping relationship between QoS flows and DRBs and/or the mapping relationship between the QoS flows and LCHs includes at least one of steps described below.

The first node determines a mapping relationship between QoS flows and DRBs on a first node side, and a mapping relationship between QoS flows and DRBs on a second node side.

The first node determines a mapping relationship between the QoS flows and LCHs on the first node side, and a mapping relationship between the QoS flows and LCHs on the second node side.

Each of a plurality of nodes with multiple connections to be established with the terminal determines a mapping relationship between QoS flows and DRBs located at each of the plurality of nodes.

Each of the plurality of nodes with multiple connections to be established with the terminal determines a mapping relationship between the QoS flows and LCHs located at each of the plurality of nodes.

One or more anchor nodes where each bearer of the terminal is located determines a mapping relationship between QoS flows and DRBs and/or a mapping relationship between the QoS flows and LCHs; or one or more anchor nodes where each split bearer of the terminal is located determines a mapping relationship between QoS flows and DRBs or LCHs of each branch of the split bearer, where the anchor node is a node where a PDCP entity corresponding to each bearer is located.

In some embodiments, the mapping relationship between QoS flows and DRBs includes at least one of: determining to map a plurality of designated QoS flows to a same DRB or determining a total number of DRBs required for the QoS flows to be mapped to.

In some embodiments, the mapping relationship between the QoS flows and LCHs includes at least one of: determining to map the plurality of designated QoS flows to a same LCH or determining a total number of LCHs required for the QoS flows to be mapped to.

In some embodiments, the step of determining, by each of the plurality of nodes with multiple connections to be established with the terminal, the mapping relationship between QoS flows and DRBs located at each of the plurality of nodes includes at least one of steps described below.

The first node determines a mapping relationship between QoS flows and DRBs borne by a first node cell group, or determines a mapping relationship between QoS flows corresponding to a first node cell group split bearer and DRBs of a first node branch of the first node cell group split bearer, or determines a mapping relationship between QoS flows corresponding to a second node cell group split bearer and DRBs of a first node branch of the second node cell group split bearer.

The second node determines a mapping relationship between QoS flows and DRBs borne by a second node cell group, or determines a mapping relationship between the QoS flows corresponding to the second node cell group split bearer and DRBs of a second node branch of the second node cell group split bearer, or determines a mapping relationship between the QoS flows corresponding to the first node cell group split bearer and DRBs of a second node branch of the first node cell group split bearer.

In some embodiments, the step of determining, by each of the plurality of nodes with multiple connections to be established with the terminal, the mapping relationship between the QoS flows and LCHs located at each of the plurality of nodes includes at least one of steps described below.

The first node determines a mapping relationship between the QoS flows and LCHs borne by the first node cell group, or determines a mapping relationship between the QoS flows corresponding to the first node cell group split bearer and LCHs of the first node branch of the first node cell group split bearer, or determines a mapping relationship between the QoS flows corresponding to the second node cell group split bearer and LCHs of the first node branch of the second node cell group split bearer.

The second node determines a mapping relationship between the QoS flows and LCHs borne by the second node cell group, or determines a mapping relationship between the QoS flows corresponding to the second node cell group split bearer and LCHs of the second node branch of the second node cell group split bearer, or determines a mapping relationship between the QoS flows corresponding to the first node cell group split bearer and LCHs of the second node branch of the first node cell group split bearer.

In some embodiments, the step in which the one or more anchor nodes where each bearer of the terminal is located determines the mapping relationship between QoS flows and DRBs and/or the mapping relationship between the QoS flows and LCHs or the step in which the one or more anchor nodes where each split bearer of the terminal is located determines the mapping relationship between QoS flows and DRBs or LCHs of each branch of the split bearer includes at least one of steps described below.

The first node determines the mapping relationship between the QoS flows and the DRBs and/or the LCHs borne by the first node cell group, or determines the mapping relationship between the QoS flows corresponding to the first node cell group split bearer and the DRBs and/or the LCHs of the first node branch of the first node cell group split bearer, and the mapping relationship between the QoS flows corresponding to the first node cell group split bearer and the DRBs and/or the LCHs of the second node branch of the first node cell group split bearer.

The second node determines the mapping relationship between the QoS flows and the DRBs and/or the LCHs borne by the second node cell group, or determines the mapping relationship between the QoS flows corresponding to the second node cell group split bearer and the DRBs and/or the LCHs of the first node branch of the second node cell group split bearer, and the mapping relationship between the QoS flows corresponding to the second node cell group split bearer and the DRBs and/or the LCHs of the second node branch of the second node cell group split bearer.

In some embodiments, the step in which the first node obtains the configuration information for the terminal includes that the first node determines configuration information for a DRB ID allocated to a bearer between the terminal and a node.

In some embodiments, an anchor node where the bearer is located determines the DRB ID of the bearer or a DRB ID of a first node split branch of the bearer and a DRB ID of a second node split branch of the bearer.

In some embodiments, before the first node obtains the configuration information for the terminal, a DRB ID space shared by the first node and the second node is determines according to a second preset manner.

In some embodiments, the step of determining, according to the second preset manner, the DRB ID space shared by the first node and the second node includes one of steps described below.

The first node determines a value range of the shared DRB ID space.

The first node determines the value range of the shared DRB ID space in case that the first node is a long term evolution (LTE) base station.

The first node and the second node negotiate the value range of the shared DRB ID space in case that the first node is an evolved LTE (eLTE) base station or a 5G base station and the second node is the LTE base station.

The first node and the second node negotiate the value range of the shared DRB ID space in case that the first node and the second node are any base station.

In some embodiments, before the first node obtains the configuration information for the terminal, the method further includes that the first node determines a DRB ID space and/or available DRB IDs in a third preset manner.

In some embodiments, the step in which the first node determines the DRB ID space and/or the available DRB IDs in the third preset manner includes at least one of steps described below.

In case that the first node determines to initiate a second node addition, the first node notifies the second node of DRB IDs unused by the first node, or an entire value range of the DRB ID space and DRB IDs used by the first node.

In case that the first node determines to initiate the second node addition, the first node notifies the second node of the DRB IDs unused by the first node and receives a feedback message sent by the second node, where in case that the second node rejects or modifies the DRB IDs unused, the feedback message carries a rejection or modification cause for the DRB IDs unused by the first node.

The first node modifies the DRB IDs unused by the first node according to the feedback message after the first node receives the feedback message sent by the second node, and re-initiates the second node addition to the second node.

In some embodiments, a rejection or modification cause includes at least one of: a rejection of the DRB IDs unused, a rejection of a range of the DRB ID space, a failure to support the DRB IDs unused, a failure to support the range of the DRB ID space, the DRB IDs unused exceeding a supportable upper limit of the second node or the range of the DRB ID space exceeding the supportable upper limit of the second node.

In some embodiments, in case that the first node initiates a second node modification or receives the second node modification initiated by the second node, in response to an addition of one or more DRBs or a deletion of one or more existing DRBs, the first node updates a state of the DRB IDs unused or a state of the DRB IDs used, and notifies another node connected to the terminal of updated information.

In some embodiments, the first node is a master node and the second node is a secondary node.

Another embodiment of the present application further provides a radio bearer configuration method. The method includes steps described below. A second node receives a request message for a second node addition or a second node modification and sent by a first node connected to a terminal. The second node sends configuration information for the terminal configured by the second node to the first node according to the request message and is connected to the terminal according to the configuration information.

It is to be added that the preceding steps may be performs by the second node. In some embodiments, the second node may perform configurations of the terminal made by the second node in all the embodiments described above.

In some embodiments, in case that the second node determines that a second node modification initiated by the first node is received or initiates the second node modification, in response to detecting a DRB addition or a DRB deletion, the second node updates DRB ID resources and notifies another node connected to the terminal of updated information.

Another embodiment of the present application further provides a radio bearer configuration method. The method includes: receiving configuration information sent by a first node, where the configuration information carries a configuration of the terminal made by the first node and/or a second node; and being connected to the first node and the second node according to the configuration information. It is to be added that this embodiment may be executed in a terminal.

In some embodiments, after the terminal is connected to the first node and the second node according to the configuration information, the method further includes steps described below.

The terminal receives a radio resource control (RRC) connection reconfiguration message sent by the first node or the second node, where the RRC connection reconfiguration message carries DRB configuration information.

The terminal configures a connection with the first node or a connection with the second node according to the RRC connection reconfiguration message.

In some embodiments, after the terminal receives the RRC connection reconfiguration message sent by the first node or the second node, where the RRC connection reconfiguration message carries the DRB configuration information, the method further includes a step described below.

The terminal feeds a message for indicating an RRC reconfiguration failure back in case that the terminal succeeds in detecting that node branches of a split bearer are configured with different DRB IDs or different DRBs are configured with a same DRB ID.

In some embodiments, the message for indicating the RRC reconfiguration failure carries a failure cause, where the failure cause includes one of: a DRB identity (ID) configuration error, repeated DRB ID configurations, non-unique DRB ID configurations or an ID configuration error of a split DRB.

The present application is described below in detail in conjunction with preferred embodiments.

Methods described below each are used in a DC or MC scenario.

It is to be noted that methods described in the embodiments described below are parallel to each other, and numbers do not explicitly define a particular sequence.

1. Who determines a mapping relationship between QoS flows and data radio bearers (DRBs) and a mapping relationship between the QoS flows and logical channels (LCHs) (Who decide the QoS flow mapping to DRB and LCH (Logical Channel)? For the above technical problem, several implementation manners are described below.

1a) An MN determines a mapping relationship between QoS flows and DRBs on an MN side and a mapping relationship between QoS flows and DRBs on each multi-connectivity SN side, where the mapping relationship includes QoS flow IDs mapped to the same DRB and a number of DRBs required to be configured.

1b) The MN determines a mapping relationship between the QoS flows and LCHs on the MN side and a mapping relationship between the QoS flows and LCHs on each multi-connectivity SN side, where the mapping relationship includes QoS flow IDs mapped to the same LCH and a number of LCHs required to be configured.

1c) Each multi-connectivity node determines a mapping relationship between QoS flows and DRBs on its own side.

That is, the MN determines a mapping relationship between QoS flows corresponding to an MCG bearer and DRBs or a mapping relationship between QoS flows corresponding to an MCG split bearer and DRBs of an MN branch of the MCG split bearer; an SN determines a mapping relationship between QoS flows corresponding to an SCG bearer and DRBs or a mapping relationship between QoS flows corresponding to an SCG split bearer and DRBs of an SN branch of the SCG split bearer.

1c) Each multi-connectivity node determines a mapping relationship between the QoS flows and LCHs on its own side.

That is, the MN determines a mapping relationship between the QoS flows corresponding to the MCG bearer or QoS flows corresponding to an MCG part of the MCG split bearer and LCHs on the MN side; the SN determines a mapping relationship between QoS flows corresponding to the SCG bearer or QoS flows corresponding to an SCG part of the SCG split bearer and LCHs on an SN side.

1e) One or more anchor nodes where a bearer is located determines a mapping relationship between QoS flows corresponding to the bearer and DRB/LCHs, or a mapping relationship between the QoS flows corresponding to the bearer and DRBs/LCHs of each branch of the bearer.

That is, the MN determines a mapping relationship between the QoS flows corresponding to the MCG bearer and DRBs/LCHs, or a mapping relationship between the QoS flows corresponding to the MCG split bearer and DRBs/LCHs of the MN branch of the MCG split bearer and a mapping relationship between the QoS flows corresponding to the MCG split bearer and DRBs/LCHs of an SN branch of the MCG split bearer; an SN determines a mapping relationship between the QoS flows corresponding to the SCG bearer and DRBs/LCHs, or a mapping relationship between the QoS flows corresponding to the SCG split bearer and DRBs/LCHs of an MN branch of the SCG split bearer and a mapping relationship between the QoS flows corresponding to the SCG split bearer and DRBs/LCHs of the SN branch of the SCG split bearer.

2. Who determines an assignment of DRB IDs (Who decide the DRB ID assignment)?

The anchor node where the bearer is located determines DRB IDs of the bearer or DRB IDs of all branches of the bearer. Specifically, the MN determines DRB IDs of the MCG bearer or DRB IDs of all branches of the MCG split bearer; the SN determines DRB IDs of the SCG bearer or DRB IDs of all branches of the SCG split bearer.

3. Who determines a DRB ID space/pool shared by the MN and the SN (Who decide the DRB ID space/pool shared by MN and SN)? For the above problem, three implementation manners may be employed. It is to be noted that the DRB ID space is also referred to as the DRB ID pool.

3a) The MN determines a range of the DRB ID space/pool, and the SN may reject the range if the SN cannot accept the range.

3b) If the MN is an LTE evolved NodeB (eNB), the MN determines the range of the DRB ID space/pool. If the MN is an eLTE base station or a 5G gNB and the SN is the LTE eNB, the MN negotiates with the SN to determine the range of the DRB ID space/pool.

3c) The MN negotiates with the SN to determine the range of the DRB ID space/pool in any case.

4. As for a negotiation of the DRB ID space/pool (Negotiation of DRB ID space/pool), this embodiment includes implementation manners described below.

4a) When the MN initiates an SN addition, the MN should provide the SN with available (unused) DRB IDs or provide the SN with the complete range of the DRB ID space/pool and DRB IDs that have been used by the MN.

4b) When the SN receives the available DRB IDs or the complete range of the DRB ID space/pool provided by the MN, the SN may accept/reject/modify the available DRB IDs or the range of the DRB ID space/pool, and sends a feed back to the MN.

When the SN rejects/modifies the available DRB IDs or the range of the DRB ID space/pool, the SN may carry a corresponding rejection/modification cause in the feedback, where the cause includes a rejection of the available DRB IDs (also referred to DRB IDs unused by the MN), a rejection of the range of the DRB ID space/pool, a failure to support the available DRB IDs, a failure to support the range of the DRB ID space/pool, the available DRB IDs exceeding a supportable upper limit, the range of the DRB ID space/pool exceeding the supportable upper limit and the like.

4c) When the MN receives the available DRB IDs or the range of the DRB ID space/pool modified by the SN, the MN may perform a modification according to situations and determines whether to re-initiate the SN addition to the SN.

4d) When the MN or SN initiates an SN modification, if a DRB is added or deleted, the MN or the SN should update a state of the DRB ID space/pool, states of the available DRB IDs or states of the DRB IDs that have been used, and notify another dual connectivity/multi-connectivity node.

5. UE behavior

5a) After a UE receives an RRC connection reconfiguration message including a DRB configuration and sent by the MN or the SN, the UE needs to check whether DRB IDs of branches that split DRBs are the same. In case that DRB IDs of branches that split DRBs are not the same, the UE should feed an RRC reconfiguration failure message back which carries a corresponding failure cause. The failure cause includes a DRB ID configuration error, inconsistent DRB ID configurations, an ID configuration error of split DRBs and the like.

5b) After the UE receives the RRC connection reconfiguration message including the DRB configuration and sent by the MN or the SN, the UE needs to check whether DRB IDs of the branches are repeated. If so, the UE should feed the RRC reconfiguration failure message back which carries the corresponding failure cause. The failure cause includes the DRB ID configuration error, repeated DRB ID configurations, non-unique DRB ID configurations and the like.

Examples of the Preferred Embodiments of the Present Application are Given Below.

Example 1: An MN establishes an MCG bearer and an SCG bearer in an SN addition process, configures QoS flow mapping relationships and DRB IDs, and coordinates a DRB ID space/pool in the process.

A scenario in which an eLTE base station, eNB, and a 5G NR base station, gNB, form dual connectivity is used as an example, where a master node may be the eNB or the gNB (5G base station).

Figure 5:
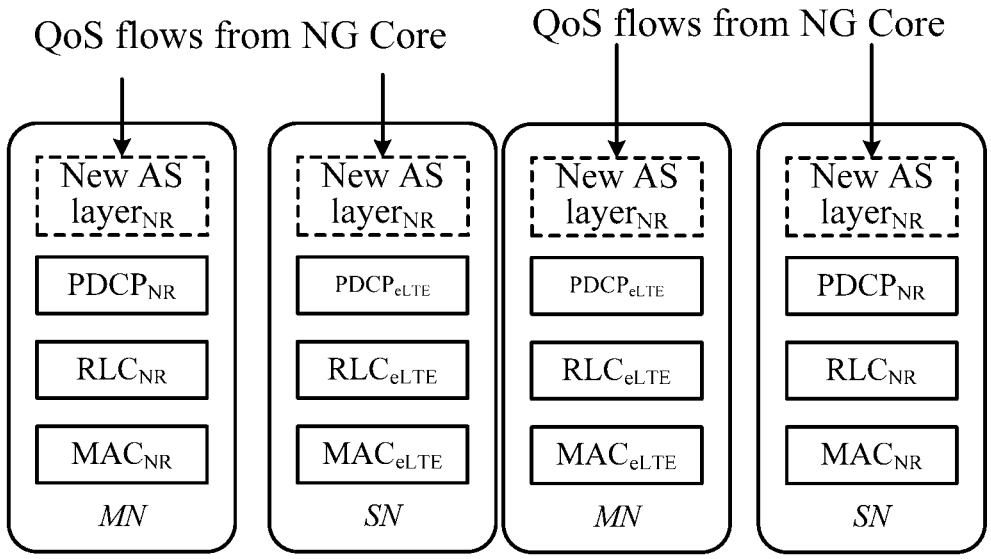
FIG. 5 is a schematic diagram of a user plane protocol stack when an MCG bearer and an SCG bearer are respectively configured in an MN and an SN in a dual connectivity scenario.

FIG. 5 is a schematic diagram of a user plane protocol stack when an MCG bearer and an SCG bearer are respectively configured in an MN and an SN in a dual connectivity scenario. As shown in FIG. 5, FIG. 5-*a* is a schematic diagram when the MG is the gNB and FIG. 5-*b* is a schematic diagram when the MG is the eNB.

Figure 6:
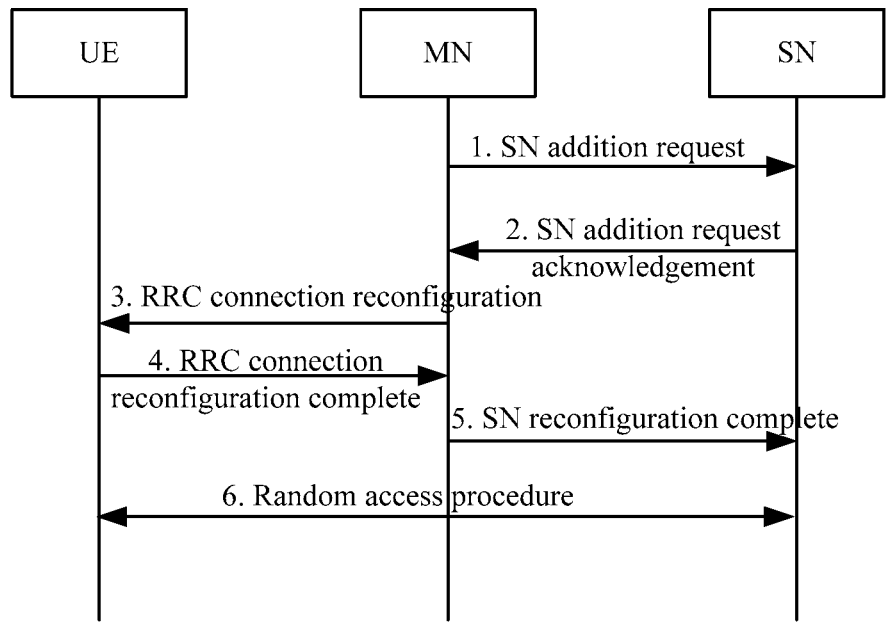
FIG. 6 is a flowchart illustrating an example of an SN addition according to an example 1.

FIG. 6 is a flowchart illustrating an example of an SN addition according to an example 1. As shown in FIG. 6, steps below are included.

In step 1, when the MN determines to add one SN to form the DC, the MN sends an addition request message to the selected SN, where the message includes at least information (a number of QoS flows and a QoS flow ID) on QoS flows split for the SN.

In step 2, if the SN receives the request from the MN and parameter configurations sent by the MN, the SN feeds back an ACK, where the ACK includes an air interface parameter configuration configured by the SN for the UE (an SN RRC container form may be included in an addition request ACK message).

In step 3, an RRC connection reconfiguration is sent.

In step 4, the MN sends configuration information for newly added MCG bearer and SCG bearer and an updated air interface parameter configuration (including the air interface parameter configuration configured by the SN for the UE) to the UE and acquires a reconfiguration complete ACK from the UE, for example, the UE sends RRC connection reconfiguration complete.

In step 5, the MN notifies the SN that the UE has successfully completed an air interface parameter reconfiguration of the SN.

In step 6, a random access process includes a synchronization process between the UE and the SN to establish an air interface connection.

It is to be noted that if the technical solutions in the above-mentioned preferred embodiments are applied to the example 1, technical solutions below exist.

In response to a method 1a, the MN needs to send the SN mapping information between QoS flows and DRBs allocated by the MN to the SCG bearer, where the mapping information includes a number of DRBs and a mapping relationship between the QoS flows and the DRBs corresponding to the SCG bearer. In this example, the above information may be carried in the SN addition request message.

In response to a method 1b, the MN needs to send mapping information between the QoS flows and LCHs allocated by the MN to the SCG bearer, where the mapping information includes a number of LCHs corresponding to the SCG bearer and a mapping relationship between the QoS flows and the LCHs. In this example, the above information may be carried in the SN addition request message.

In response to a method 1c, the MN does not need to configure the mapping information between the QoS flows and the DRBs for the SCG bearer, and the SN configures the mapping information between the QoS flows and the DRBs by itself.

The MN sends the information (the number of QoS flows, the QoS flow ID or a QoS flow ID list) on QoS flows split for the SN to the SN (in this example, the information may be carried in the SN addition request message).

The SN sends the mapping information between the QoS flows and the DRBs configured by itself to the MN. In this example, the mapping information may be carried in the SN addition request ACK message. In addition, the SN may also send the mapping information in a cell form of an SN RRC container through the SN addition request ACK message to the UE.

In response to a method 1d, the MN does not need to configure the mapping information between the QoS flows and the LCHs for the SCG bearer, and the SN configures the mapping information between the QoS flows and the LCHs by itself.

The MN sends the information (the number of QoS flows, the QoS flow ID or the QoS flow ID list) on QoS flows split for the SN to the SN (in this example, the information may be carried in the SN addition request message).

The SN sends the mapping information between the QoS flows and the LCHs configured by itself to the MN. In this example, the mapping information may be carried in the SN addition request ACK message. In addition, the SN may also send the mapping information in the SN RRC container information element through the SN addition request ACK message to the UE.

In response to a method 1e, the MN does not need to configure the mapping information between the QoS flows and the DRBs and/or the LCHs for the SCG bearer, and the SN configures the mapping information by itself.

The MN sends the information (the number of QoS flows, the QoS flow ID or the QoS flow ID list) on QoS flows split for the SN to the SN (in this example, the information may be carried in the SN addition request message).

The SN sends the mapping information between the QoS flows and the DRBs and/or the LCHs configured by itself to the MN. In this example, the mapping information may be carried in the SN addition request ACK message. In addition, the SN may also send the mapping information in the SN RRC container information element through the SN addition request ACK message to the UE.

In response to a method 2a, the MN and the SN respectively allocate DRB-IDs of DRBs on an MN side and an SN side, and the MN may send DRB-IDs corresponding to the MCG bearer and configured by the MN to the SN. In this example, the DRB-IDs corresponding to the MCG bearer may be carried in the SN addition request message.

The SN may send DRB-IDs corresponding to the SCG bearer and configured by the SN to the MN. In this example, the DRB-IDs corresponding to the SCG bearer may be carried in the SN addition request ACK message.

In response to a method 5b, after receiving an RRC connection reconfiguration message including a DRB configuration and sent by the MN or the SN, the UE needs to check whether DRB IDs of branches are repeated. In case that the DRB IDs of branches are repeated, the UE should feed an RRC reconfiguration failure message back which carries a corresponding failure cause. The failure cause includes a DRB ID configuration error, repeated DRB ID configurations, non-unique DRB ID configurations and the like.

Example 2: An MN establishes an MCG split bearer in an SN addition process.

A process in which an eLTE base station, eNB, and a 5G NR base station, gNB, form dual connectivity is used as an example, where a master node may be the eNB or the gNB.

Figure 7:
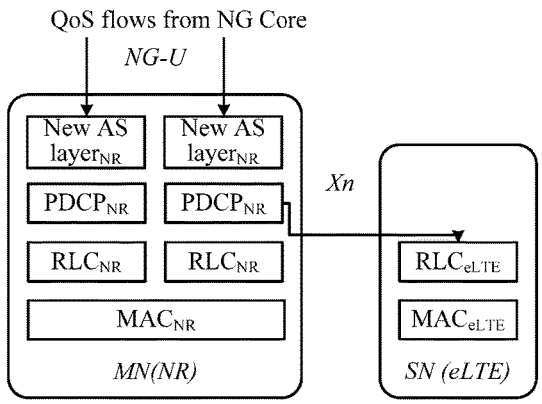
FIG. 7 is a schematic diagram of a user plane protocol stack when an MCG split bearer and an SCG split bearer are respectively configured in an MN and an SN in a dual connectivity scenario according to an example 2.
Figure 7:
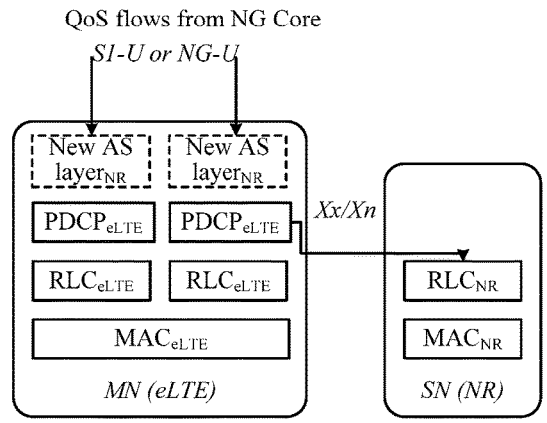

FIG. 7 is a schematic diagram of a user plane protocol stack when an MCG split bearer and an SCG split bearer are respectively configured in an MN and an SN in a dual connectivity scenario according to the example 2. As shown in FIG. 7, FIG. 7-*a* is a schematic diagram when the MN is the gNB and FIG. 7-*b* is a schematic diagram when the MN is the eNB.

It is to be added that an example flow of an SN addition may still be referred to FIG. 6.

If the technical solutions in the above-mentioned preferred embodiments are applied to an SN addition process in the example 2, technical solutions below exist.

In response to a method 1a, the MN needs to send an SN mapping information between QoS flows and DRBs allocated by the MN to an SN branch of the MCG split bearer, where the mapping information includes a number of DRBs corresponding to the SN branch of the MCG split bearer and a mapping relationship between the QoS flows and the DRBs. In this example, the above information may be carried in an SN addition request message.

In response to a method 1b, the MN needs to send the SN mapping information between the QoS flows and LCHs allocated by the MN to the SN branch of the MCG split bearer, where the mapping information includes a number of LCHs corresponding to the SN branch of the MCG split bearer and a mapping relationship between the QoS flows and the LCHs. In this example, the above information may be carried in the SN addition request message.

In response to a method 1c, the MN configures a mapping relationship between QoS flows and DRBs for an MN branch of the MCG split bearer.

The MN sends information (a number of QoS flows, a QoS flow ID or a QoS flow ID list) on QoS flows split for the SN to the SN (in this example, the information may be carried in the SN addition request message).

The SN configures a mapping relationship between QoS flows and DRBs for the SN branch of the MCG split bearer and sends the mapping relationship to the MN. In this example, the mapping relationship may be carried in an SN addition request ACK message. In addition, the SN may also send the mapping relationship in a cell form of an SN RRC container through the SN addition request ACK message to a UE.

In response to a method 1d, the MN configures a mapping relationship between the QoS flows and LCHs for the MN branch of the MCG split bearer.

The MN sends the information (the number of QoS flows, the QoS flow ID or the QoS flow ID list) on QoS flows split for the SN to the SN (in this example, the information may be carried in the SN addition request message).

The SN configures a mapping relationship between the QoS flows and LCHs for the SN branch of the MCG split bearer and sends the mapping relationship to the MN. In this example, the mapping relationship may be carried in the SN addition request ACK message. In addition, the SN may also send the mapping relationship in the SN RRC container information element through the SN addition request ACK message to the UE.

In response to a method 1e, the MN needs to send the SN the mapping information between the QoS flows and the DRBs and/or the LCHs allocated by the MN to the SN branch of the MCG split bearer, where the mapping information includes the number of DRBs and the number of LCHs corresponding to the SN branch of the MCG split bearer, the mapping relationship between the QoS flows and the DRBs and the mapping relationship between the QoS flows and the LCHs. In this example, the above information may be carried in the SN addition request message.

In response to a method 2a, since an anchor node of the MCG split bearer is the MN, the MN configures DRB-IDs for the MN branch and the SN branch of the MCG split bearer.

DRB IDs of the MN branch of the MCG split bearer should be guaranteed to be the same as DRB IDs of the SN branch of the MCG split bearer.

The MN sends the DRB-IDs configured by the MN for the SN branch of the MCG split bearer to the SN. In this example, the DRB-IDs of the SN branch of the MCG split bearer may be carried in the SN addition request message.

In response to a method 5a, after receiving an RRC connection reconfiguration message including a DRB configuration and sent by the MN or the SN, the UE needs to check whether DRB IDs of branches that split DRBs are the same. In case that the DRB IDs of branches that split DRBs are not the same, the UE should feed an RRC reconfiguration failure message back which carries a corresponding failure cause. The failure cause includes a DRB ID configuration error, inconsistent DRB ID configurations, an ID configuration error of split DRBs and the like.

In response to a method 5b, after receiving the RRC connection reconfiguration message including the DRB configuration and sent by the MN or the SN, the UE needs to check whether DRB IDs of branches are repeated. In case that the DRB IDs of branches are repeated, the UE should feed the RRC reconfiguration failure message back which carries the corresponding failure cause. The failure cause includes the DRB ID configuration error, repeated DRB ID configurations, non-unique DRB ID configurations and the like.

Example 3: An MN establishes an MCG bearer and an SCG split bearer in an SN addition process.

A process in which an eLTE base station, eNB, and a 5G NR base station, gNB, form dual connectivity is used as an example, where the MN may be the eNB or the gNB.

Figure 8:
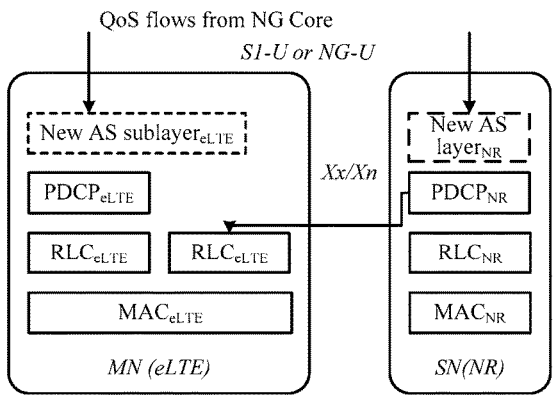
FIG. 8 is a schematic diagram of a user plane protocol stack when an SCG split bearer is separately configured in an MN and an SN in a dual connectivity scenario according to an example 3.
Figure 8:
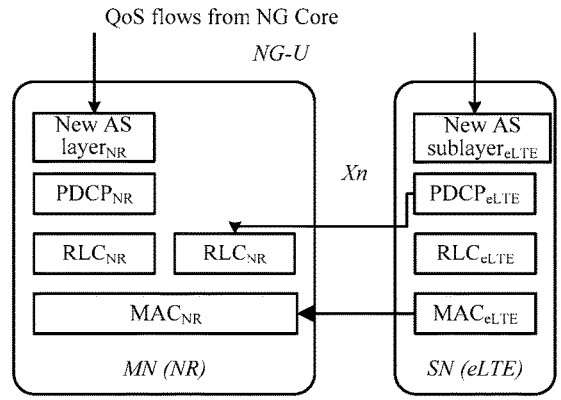

FIG. 8 is a schematic diagram of a user plane protocol stack when an SCG split bearer and the SCG split bearer are respectively configured in an MN and an SN in a dual connectivity scenario according to the example 3. As shown in FIG. 8, FIG. 8-a is a schematic diagram when the MN is the eNB and FIG. 8-b is a schematic diagram when the MN is the gNB.

It is to be added that an example flow of an SN addition may still be referred to FIG. 6.

If the technical solutions in the above-mentioned preferred embodiments are applied to an SN addition process in the example 2, technical solutions below exist.

In response to a method 1a, the MN configures mapping information between QoS flows and DRBs for a local MCG bearer, where the mapping information includes a number of DRBs corresponding to the MCG bearer and a mapping relationship between the QoS flows and the DRBs.

The MN sends the SN mapping information between QoS flows and DRBs allocated by the MN to an MN branch and an SN branch of the SCG split bearer, where the mapping information includes a number of DRBs corresponding to the SCG split bearer, a mapping relationship between QoS flows and DRBs of the MN branch, and a mapping relationship between QoS flows and DRBs of the SN branch. In this example, the above information may be carried in an SN addition request message.

In response to a method 1b, the MN configures mapping information between QoS flows and LCHs for the local MCG bearer, where the mapping information includes a number of LCHs corresponding to the MCG bearer and a mapping relationship between the QoS flows and the LCHs.

The MN needs to send the SN mapping information between QoS flows and LCHs allocated by the MN to the MN branch and the SN branch of the SCG split bearer, where the mapping information includes a number of LCHs corresponding to the SCG split bearer, a mapping relationship between QoS flows and LCHs of the MN branch, and a mapping relationship between QoS flows and LCHs of the SN branch. In this example, the above information may be carried in the SN addition request message.

In response to a method 1c, the MN configures a mapping relationship between QoS flows and DRBs for an MN branch of the MCG bearer.

The MN configures a mapping relationship between QoS flows and DRBs for the MN branch of the SCG split bearer, and sends the mapping relationship to the SN.

The MN sends information (a number of QoS flows, a QoS flow ID or a QoS flow ID list) on QoS flows split for the SN to the SN (in this example, the information may be carried in the SN addition request message).

The SN configures a mapping relationship between QoS flows and DRBs for the SN branch of the SCG split bearer and sends the mapping relationship to the MN. In this example, the mapping relationship may be carried in an SN addition request ACK message. In addition, the SN may also send the mapping relationship in a cell form of an SN RRC container through the SN addition request ACK message to a UE.

In response to a method 1d, the MN configures a mapping relationship between the QoS flows and LCHs for the MN branch of the MCG bearer.

The MN configures a mapping relationship between the QoS flows and LCHs for the MN branch of the SCG split bearer, and sends the mapping relationship to the SN.

The MN sends the information (the number of QoS flows, the QoS flow ID or the QoS flow ID list) on QoS flows split for the SN to the SN (in this example, the information may be carried in the SN addition request message).

The SN configures a mapping relationship between the QoS flows and LCHs for the SN branch of the SCG split bearer and sends the mapping relationship to the MN. In this example, the mapping relationship may be carried in the SN addition request ACK message. In addition, the SN may also send the mapping relationship in the SN RRC container information element through the SN addition request ACK message to the UE.

In response to a method 1e, the MN configures the mapping relationship between the QoS flows and the DRBs/LCHs for the MCG bearer.

The MN sends the information (the number of QoS flows, the QoS flow ID or the QoS flow ID list) on QoS flows split for the SN to the SN (in this example, the information may be carried in the SN addition request message).

The SN configures a mapping relationship between the QoS flows and the DRBs/LCHs for the MN branch and the SN branch of the SCG split bearer and sends the mapping relationship to the MN. In this example, the mapping relationship may be carried in the SN addition request ACK message. In addition, the SN may also send the mapping relationship in the SN RRC container information element through the SN addition request ACK message to the UE.

In response to a method 2a, since an anchor node of the SCG split bearer is the SN, the SN configures DRB-IDs for the MN branch and the SN branch of the SCG split bearer.

DRB IDs of the MN branch of the SCG split bearer should be guaranteed to be the same as DRB IDs of the SN branch of the SCG split bearer.

The SN sends the DRB-IDs configured by the SN for the MN branch and the SN branch of the SCG split bearer to the MN. In this example, the DRB-IDs may be carried in the SN addition request ACK message. In addition, the DRB-IDs of the SN may also be included in the SN addition request ACK message in a form of the SN RRC container to be sent to the UE.

In response to a method 5a, after receiving an RRC connection reconfiguration message including a DRB configuration and sent by the MN or the SN, the UE needs to check whether DRB IDs of branches that split DRBs are the same. If not, the UE should feed an RRC reconfiguration failure message back which carries a corresponding failure cause. The failure cause includes a DRB ID configuration error, inconsistent DRB ID configurations, an ID configuration error of split DRBs and the like.

In response to a method 5b, after receiving the RRC connection reconfiguration message including the DRB configuration and sent by the MN or the SN, the UE needs to check whether DRB IDs of branches are repeated. If so, the UE should feed the RRC reconfiguration failure message back which carries the corresponding failure cause. The failure cause includes the DRB ID configuration error, repeated DRB ID configurations, non-unique DRB ID configurations and the like.

Example 4: An MN or an SN initiates an SN modification process.

An SN modification is configured for modifying, establishing, or releasing bearer context. A typical flow is described below.

Figure 9:
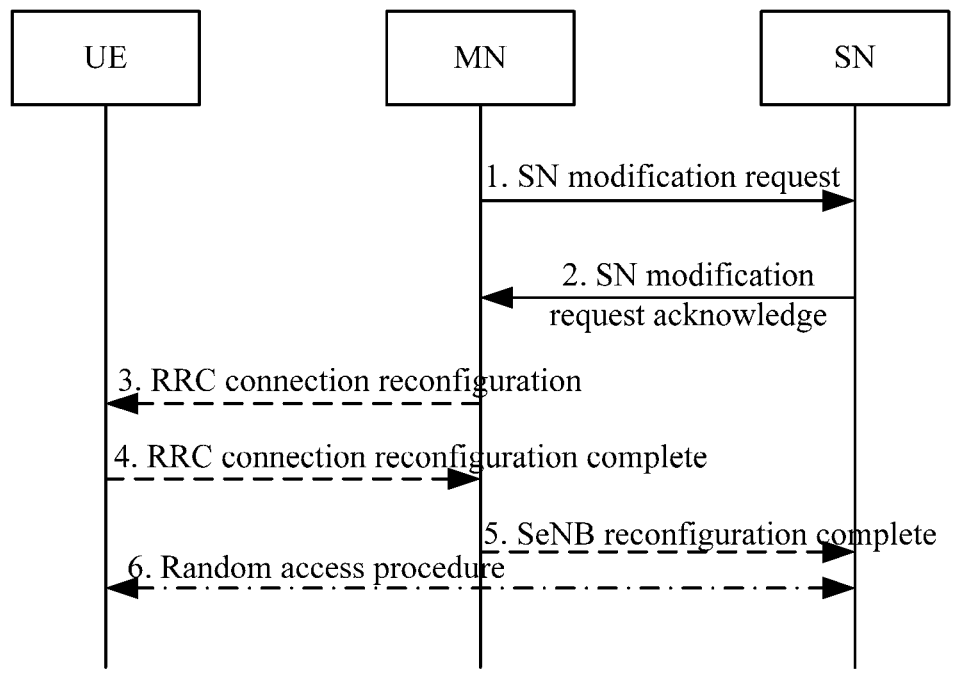
FIG. 9 is a flowchart of an SN modification initiated by an MN according to an example 4.

FIG. 9 is a flowchart of an SN modification initiated by an MN according to an example 4.

Figure 10:
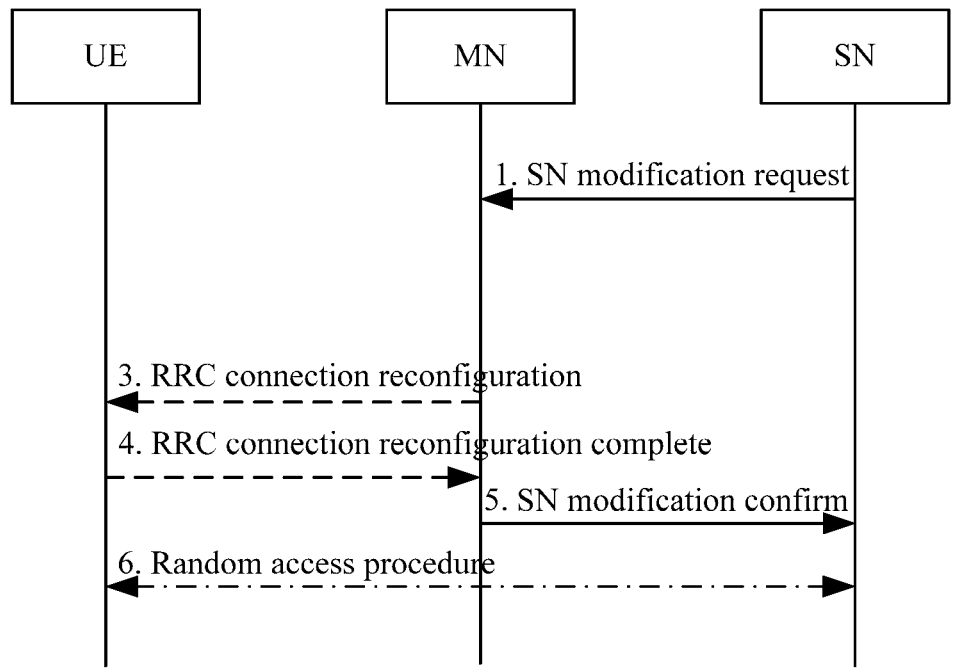
FIG. 10 is a flowchart of an SN modification initiated by an SN according to the example 4.

FIG. 10 is a flowchart of an SN modification initiated by an SN according to an example 4.

In flows in FIG. 9 and FIG. 10, whether a bearer is added or deleted, or a bearer type is modified, the applications of the above-mentioned methods are similar to those in examples 1 to 3, and a difference merely lies in that a DRB configuration, an LCH-related configuration or a mapping relationship with QoS flows configured by the MN or the SN are carried in different messages.

In this embodiment, in the flow of the SN modification initiated by the MN, a message sent by the MN to the SN is an SN modification request, and a message fed back by the SN to the MN is an SN modification ACK.

In the flow of the SN modification initiated by the SN, a message sent by the SN to the MN is the SN modification request, and a message fed back by the MN to the SN is an SN modification confirm.

Example 5: Coordination of a DRB ID Space/Pool

If the technical solutions in the above-mentioned preferred embodiments are applied to the example 5, technical solutions below exist.

In response to a method 3a, an MN needs to send a definition of the DRB ID space or pool to an SN, where the definition includes a value range of the DRB ID space/pool. In this example, the definition may be carried in an SN addition request message. If the SN disagrees on or cannot identify the definition of the DRB ID space/pool, the SN may choose to reject an SN addition and carry a rejection cause (such as a failure to support the DRB ID space/pool) in a rejection message (such as an SN addition reject message) sent to the MN.

A method 3b is applicable to a designated scenario, that is, if the MN is an LTE eNB, the MN determines a range of the DRB ID space/pool; if the MN is an eLTE base station or a 5G gNB, and the SN is the LTE eNB, the MN negotiates with the SN to determine the range of the DRB ID space/pool. The MN in this example is the eLTE (an enhanced version of LTE) base station or the 5G gNB, and thus the MN and the SN may negotiate the definition of the DRB ID space/pool, which is referred to a description of a method 3c.

In response to a method 3c, the MN needs to send the definition of the DRB ID space/pool to the SN, where the definition includes the value range of the DRB ID space/pool. In this example, the definition may be carried in the SN addition request message. If the SN disagrees on the definition of the DRB ID space/pool, the SN may choose to modify the definition and feed the modified value range of the DRB ID space/pool back to the MN. In this example, the modified value range may be carried in an SN addition request ACK message or the SN addition reject message.

If the MN disagrees on a modification of the SN, the MN may terminate an SN addition process; if the MN agrees on the modification of the SN, the MN may reconfigure DRB IDs according to the DRB ID space/pool fed back by the SN.

In response to a method 4a, 4b or 4c, it should be noted that the method 4x differs from the method 3x in that a method 4 is configured for the MN and the SN to coordinate available resources (unused resources) in the DRB ID space/pool, and the method 3 is configured for the MN and the SN to coordinate the definition of the DRB ID space/pool (that is, the value range).

When the MN initiates the SN addition, the MN needs to send available (unused) DRB IDs to the SN or provide the SN with a complete range of the DRB ID space/pool and a usage state of the DRB ID space/pool (such as the DRB ID space/pool in the form of a bitmap to reflect a used/unused state of each DRB ID in the DRB ID space/pool, or DRB IDs having been used). In this example, the above information may be carried in the SN addition request message.

After receiving the preceding information on DRB IDs provided by the MN, the SN may accept/reject/modify the available DRB IDs or the range of the DRB ID space/pool and feed a processing result back to the MN.

When the SN accepts the available DRB IDs or the range of the DRB ID space/pool, the SN may feed the SN addition request ACK message back.

When the SN rejects the available DRB IDs or the range of the DRB ID space/pool, the SN may feed the SN addition reject message back.

When the SN is to modify the preceding information on DRB IDs, the SN may feed the modified available (unused) DRB IDs or the modified range of the DRB ID space/pool back to the MN through the SN addition request ACK message or the SN addition reject message.

When the SN rejects/modifies the available DRB IDs or the range of the DRB ID space/pool, the SN may carry a corresponding rejection/modification failure cause in a feedback message, where the failure cause includes a rejection of the DRB IDs, a rejection of the range of the DRB ID space/pool, a failure to support the DRB IDs, a failure to support the range of the DRB ID space/pool, the DRB IDs exceeding a supportable upper limit, the range of the DRB ID space/pool exceeding the supportable upper limit and the like.

When the MN receives the available DRB IDs or the range of the DRB ID space/pool modified by the SN, the MN may determine whether to re-initiate the SN addition to the SN according to situations to modify the previously configured DRB IDs.

In response to a method 4d, when the MN or SN initiates an SN modification, if a DRB is added or deleted, the MN or the SN should update the usage state of the DRB ID space/pool, states of the available DRB IDs or states of the DRB IDs that have been used, and notify another dual connectivity/multi-connectivity node, for example, through an SN modification ACK message, SN modification confirm message or another inter-node interface message.

From the description of the preceding implementation manners, it will be apparent to those skilled in the art that the methods in the embodiments described above may be implemented by software plus a necessary general-purpose hardware platform, or may of course be implemented by hardware. However, in many cases, the former is a preferred implementation manner. Based on this understanding, the solution provided by the present application substantially, or the part contributing to the existing art, may be embodied in the form of a software product. The computer software product is stored on a storage medium (such as a read-merely memory (ROM)/random access memory (RAM), a magnetic disk or an optical disk) and includes several instructions for enabling a terminal device (which may be a mobile phone, a computer, a server or a network device) to execute the methods according to the embodiments of the present application.

This embodiment further provides a radio bearer configuration apparatus. The apparatus is configured to implement the above-mentioned embodiments and preferred implementation manners. What has been described will not be repeated. As used below, the term "module" may be software, hardware or a combination thereof capable of implementing predetermined functions. The apparatus in the embodiments described below is preferably implemented by software, but implementation by hardware or by a combination of software and hardware is also possible and conceived.

This embodiment provides a radio bearer configuration apparatus. The apparatus is applied to a first node and includes a determining module and a first sending module. The determining module is configured to obtain configuration information for a terminal when the first node determines a second node to be connected to the terminal, where the terminal is connected to the first node and the configuration information is configured by the first node and/or the second node. The first sending module is configured to send the configuration information to the terminal, where the configuration information is configured for instructing the terminal to be connected to the first node and the second node according to the configuration information, and the terminal establishes multiple connections. It is to be added that the radio bearer configuration apparatus applied to the first node may perform all multi-connectivity configurations of the terminal made by the first node in the embodiments described above.

Another embodiment of the present application further provides a radio bearer configuration apparatus. The apparatus is applied to a second node and includes a first receiving module and a second sending module. The first receiving module is configured to receive a request message sent by a first node connected to a terminal. The second sending module is configured to send configuration information for the terminal configured by the second node to the first node according to the request message, where the second node is connected to the terminal according to the configuration information. It is to be added that the radio bearer configuration apparatus applied to the second node may perform all multi-connectivity configurations of the terminal made by the second node in the embodiments described above.

Another embodiment of the present application further provides a radio bearer configuration apparatus. The apparatus is applied to a terminal and includes a second receiving module and a connection module. The second receiving module is configured to receive configuration information sent by a first node, where the configuration information carries a configuration of the terminal made by the first node and/or a second node. The connection module is configured to be connected to the first node and the second node according to the configuration information.

It is to be noted that the various modules described above may be implemented by software or hardware. Implementation by hardware may, but may not necessarily, be performed in the following manners: the various modules described above are located in a same processor, or the various modules described above are located in their respective processors in any combination form.

Figure 11:
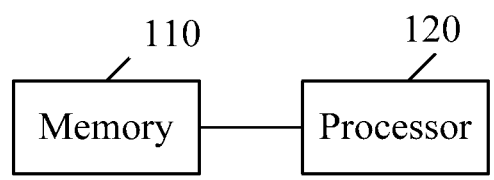
FIG. 11 is a structural diagram of a network element according to an embodiment of the present disclosure.

Another embodiment of the present application provides a network element. As shown in FIG. 11, the network element may include a memory 110 and a processor 120, where the processor 120 is connected to the memory 110 and is configured to execute programs stored on the memory 110, where the programs, when executed, perform the method according to any one optional embodiment in the embodiments described above. The network element may be the first node, the second node or the terminal described above.

Another embodiment of the present application provides a storage medium. The storage medium includes stored programs which, when executed, perform the method according to any one optional embodiment in the embodiments described above.

Apparently, those skilled in the art should understand that each of the above-mentioned modules or steps of the present application may be implemented by a general-purpose computing apparatus, the modules or steps may be concentrated on a single computing apparatus or distributed on a network formed by multiple computing apparatuses, and in some embodiments, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present application is not limited to any specific combination of hardware and software.

The above are merely preferred embodiments of the present application and are not intended to limit the present application, and for those skilled in the art, the present application may have various modifications and variations. Any modifications, equivalent substitutions, improvements and the like made within the spirit and principle of the present application should fall within the scope of the present application.

What is claimed is:

1. A wireless communication method, comprising:
operating a first node and a second node in a communication network, the first node being a master node and the second node being a secondary node, wherein one of the first node or the second node is an anchor node for a data radio bearer (DRB) comprising a packet data convergence protocol (PDCP) sublayer in which a PDCP entity is located, and wherein another one of the first node or the second node is a non-anchor node of the DRB;
determining, by another entity that is located in an L2 protocol stack of the anchor node, a mapping relationship between a quality of service (QoS) flow and the DRB, wherein the another entity of the anchor node is located above the PDCP sublayer; and
transmitting, by the anchor node, the mapping relationship between the QoS flow and the DRB to the non-anchor node.

2. The method of claim 1, wherein the DRB comprises a bearer for a first node cell group.

3. The method of claim 1, wherein the DRB comprises a bearer for a second node cell group.

4. The method of claim 1, wherein the DRB comprises a split bearer between a first node cell group and a second node cell group.

5. The method of claim 1, comprising:
determining, by the anchor node, a DRB identifier (ID) of a bearer; and
transmitting, by the anchor node, the DRB ID to the non-anchor node.

6. The method of claim 1, comprising:
determining, by the first node, available DRB IDs;
initiating an addition of the second node by the first node; and
transmitting, by the first node, the available DRB IDs to the second node.

7. The method of claim 1, comprising:
receiving, by the first node, a modification request initiated by the second node, wherein the modification request comprises an addition of one or more new DRBs or a deletion of one or more existing DRBs.

8. A system for wireless communications, comprising:
a first node in a communication network, and
a second node in the communication network, the first node being a master node and the second node being a secondary node, wherein one of the first node or the second node is an anchor node for a data radio bearer (DRB) comprising a packet data convergence protocol (PDCP) sublayer in which a PDCP entity is located, and wherein another one of the first node or the second node is a non-anchor node for the DRB,
wherein the anchor node is configured to:
determine, by another entity that is located in an L2 protocol stack of the anchor node, a mapping relationship between a quality of service (QoS) flow and the DRB, wherein the another entity of the anchor node is located above the PDCP sublayer; and
transmit the mapping relationship between the QoS flow and the DRB to the non-anchor node.

9. The system of claim 8, wherein the DRB comprises a bearer for a first node cell group.

10. The system of claim 8, wherein the DRB comprises a bearer for a second node cell group.

11. The system of claim 8, wherein the DRB comprises a split bearer between a first node cell group and a second node cell group.

12. The system of claim 8, wherein the anchor node is configured to:
determine a DRB identifier (ID) of a bearer; and
transmit the DRB ID to the non-anchor node.

13. The system of claim 8, wherein the first node is configured to:
determine available DRB IDs;
initiate an addition of the second node; and
transmit the available DRB IDs to the second node.

14. The system of claim 8, wherein the first node is configured to:
receive a modification request initiated by the second node, wherein the modification request comprises an addition of one or more new DRBs or a deletion of one or more existing DRBs.

15. The method of claim 1, wherein the non-anchor node is configured to use a Long Term Evolution (LTE) Radio Access Technology in a dual-connectivity system formed by the first node and the second node.

16. The system of claim 8, wherein the non-anchor node is configured to use a Long Term Evolution (LTE) Radio Access Technology in a dual-connectivity system formed by the first node and the second node.

* * * * *